United States Patent
Armstrong

[19]
[11] Patent Number: 5,810,408
[45] Date of Patent: Sep. 22, 1998

[54] ERGONOMICALLY EFFICIENT TOOL

[76] Inventor: Jeffrey L. Armstrong, 5421 Hilltop Crescent, Oakland, Calif. 94618

[21] Appl. No.: 660,516

[22] Filed: Jun. 7, 1996

[51] Int. Cl.⁶ .................................. A01B 1/20; B25G 1/04
[52] U.S. Cl. .............................. 294/57; 294/51; 294/53.5; 16/115
[58] Field of Search .............................. 294/19.1, 49, 51, 294/53.5, 54.5, 57; 37/265, 285; 172/372, 373, 375; 15/143.1, 144.1, 144.2, 144.3, 144.4; 16/110 R, 115; 81/177.2, 177.8, 177.9

[56] References Cited

U.S. PATENT DOCUMENTS

| | | | |
|---|---|---|---|
| 1,268,734 | 6/1918 | Lay | 81/177.8 |
| 1,427,865 | 9/1922 | Szabo . | |
| 1,431,389 | 10/1922 | Frisz | 81/177.9 |
| 2,221,219 | 11/1940 | Nelson . | |
| 2,395,245 | 2/1946 | Booharin | 15/144.2 |
| 2,750,616 | 6/1956 | Klugman | 15/144.1 |
| 2,908,929 | 10/1959 | Cotman . | |
| 2,978,938 | 4/1961 | Nalley | 81/177.8 |
| 3,222,699 | 12/1965 | Zeisig | 294/57 |
| 3,226,149 | 12/1965 | McJohnson | 294/57 |
| 3,773,375 | 11/1973 | Nehls | 37/285 |
| 4,565,398 | 1/1986 | Poulin . | |
| 4,704,758 | 11/1987 | Hoffman | 15/144.4 |
| 4,848,818 | 7/1989 | Smith . | |
| 4,985,961 | 1/1991 | Kegley | 294/57 |
| 5,060,343 | 10/1991 | Nisenbaum . | |
| 5,159,769 | 11/1992 | Odorisio . | |

FOREIGN PATENT DOCUMENTS

| | | | |
|---|---|---|---|
| 57597 | 2/1953 | France . | |
| 2142525 | 1/1985 | United Kingdom | 15/144.1 |

OTHER PUBLICATIONS

"Back Saver Rake," *ALSTO's Handy Helpers*, Michael Voyles, Vice President, Summer 1996, p. 61.

*Primary Examiner*—Dean Kramer
*Attorney, Agent, or Firm*—Brian Beverly

[57] ABSTRACT

An improved ergonomically efficient implement handle having two joints allowing the handle to be bent to selected angles at each joint and a telescoping feature between the two joints allowing the handle length to be adjusted to the height of the user. The two bendable joints and the telescoping feature cooperate to minimize the user's need to stoop over to use a blade or other implement and make it easier and more ergonomically efficient to work with the blade or other implement. A coupling feature allows multiple implements such as a blade or fork to be easily attached to the handle.

26 Claims, 4 Drawing Sheets

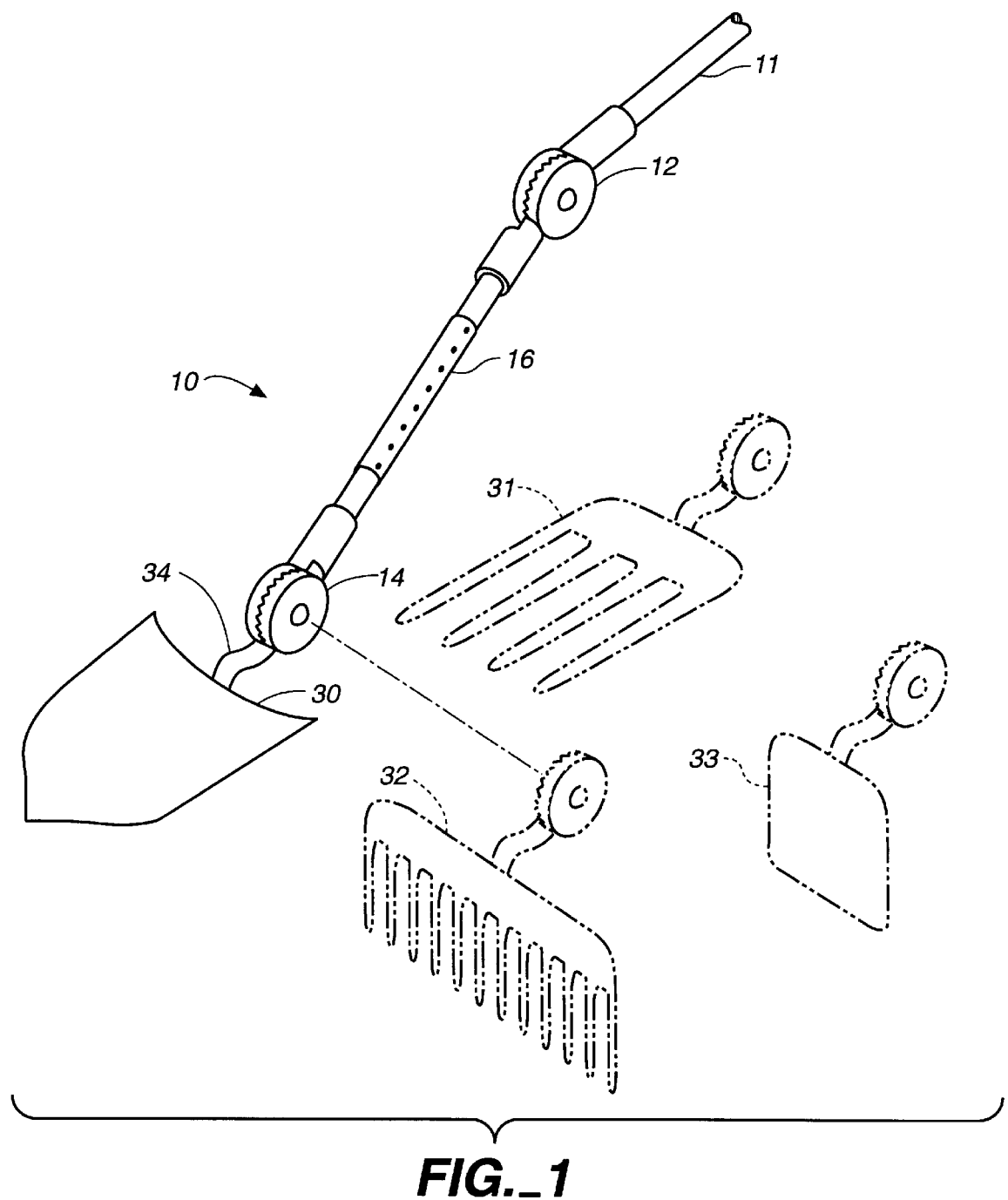
FIG._1

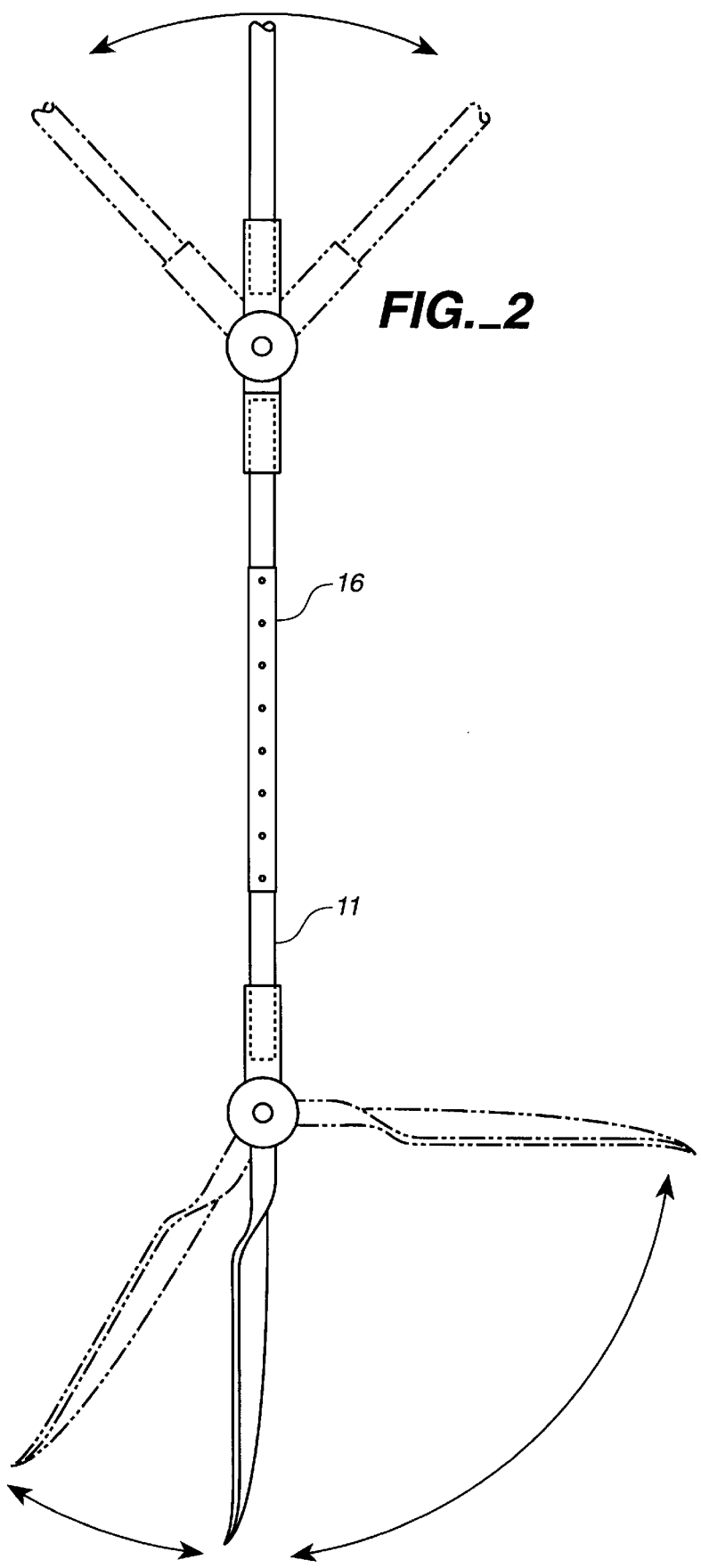
FIG._2
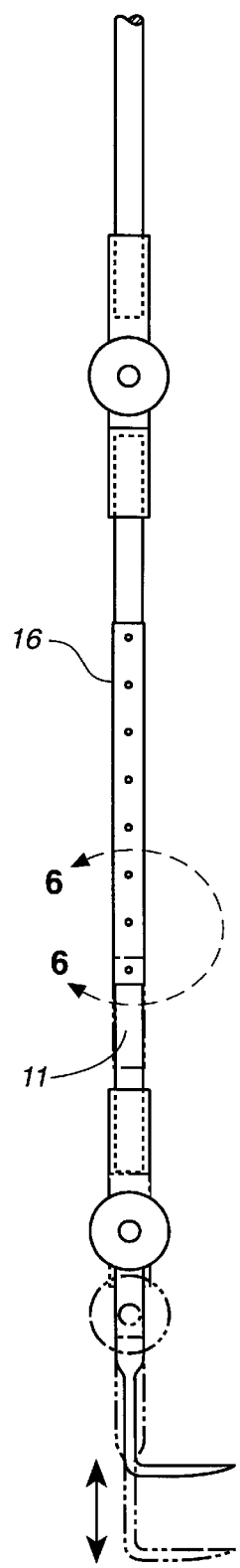
FIG._3

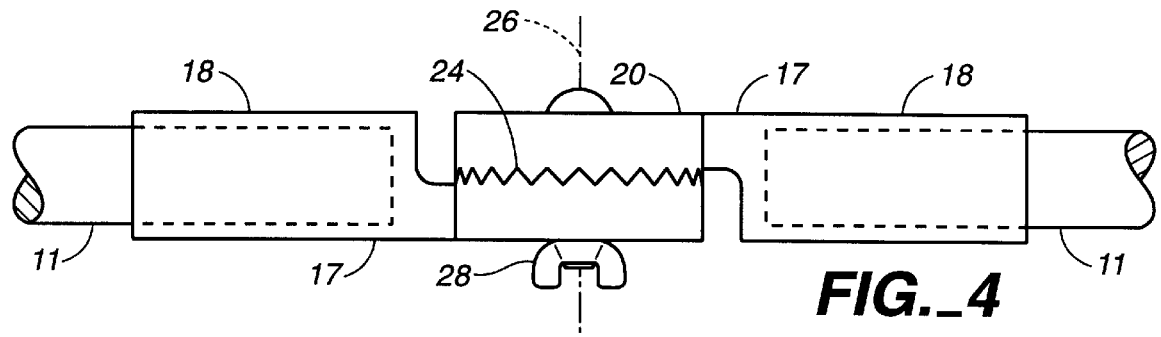
FIG._4
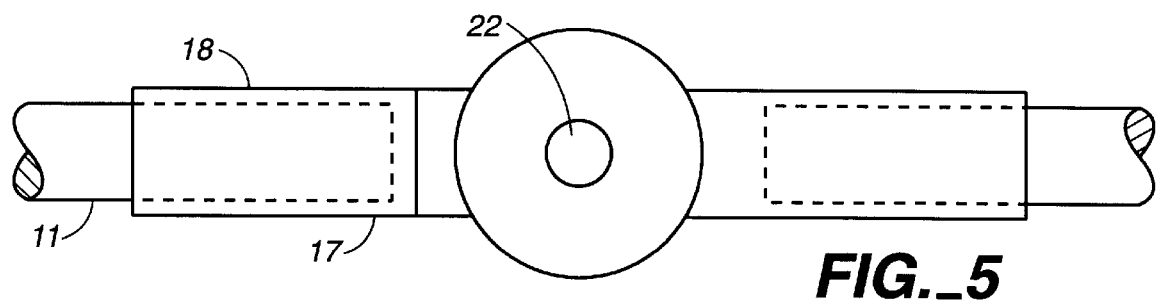
FIG._5
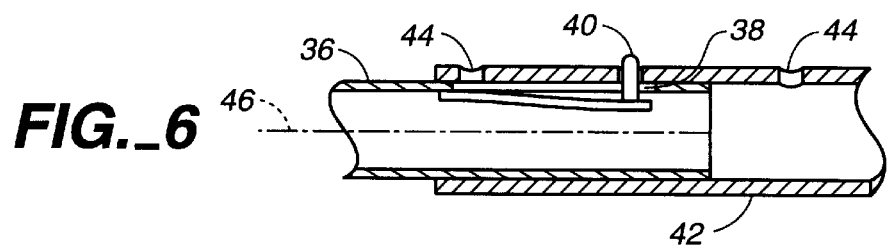
FIG._6

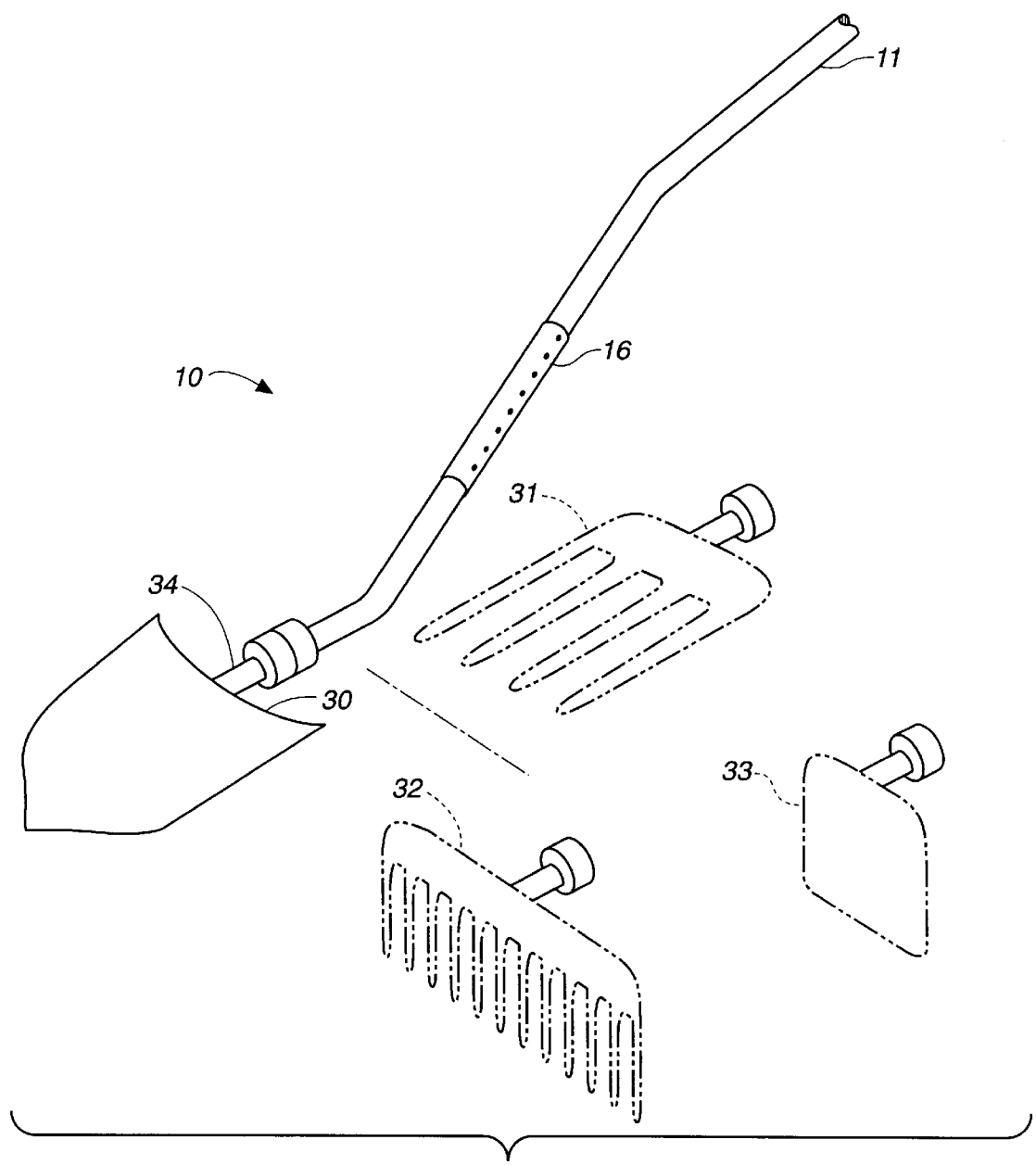
FIG._7

ERGONOMICALLY EFFICIENT TOOL

BACKGROUND

The present invention relates to a tool for working the ground, such as a shovel, including a handle having a bend or bends and a telescoping ability, the bending and telescoping features of the handle cooperating to accommodate the height of a user and make the tool more ergonomically efficient for the user. A coupling mechanism allows easy attachment of various kinds of tool heads to the handle.

Ground working tools such as spades or shovels are well known in the prior art. Most handles for such tools are straight and have a fixed length. A blade or other tool head is usually affixed to the handle at an angle determined by the manufacturer and is not adjustable or easily removable by a user. Typical operation of a spade, for example, involves either digging into a surface or removing loose materials from a hard surface, e.g., moving a mound of dirt, placing substantial vertical stress on the handle. In either case, the user must press the spade into the material to be moved and then generally stoop to grab the handle close to the tool head in order to pick up the loaded spade. This familiar work is typically referred to as "back-breaking" labor and cannot be performed efficiently by many persons, including children, the elderly, or anyone with a history of back problems.

Some efforts have been made to address the inefficiency of the standard straight-handled tool. The ergonometrically designed tool handle described in U.S. Pat. No. 5,060,343, Nisenbaum, describes a tool handle bent in three places with an offset hand grip midway down the handle. However, the Nisenbaum handle angles cannot be adjusted, nor can the handle be varied in length.

Similarly, the materials handling device described in U.S. Pat. No. 5,159,769, Odorisio, discloses a materials handling device handle bent at two angles to facilitate the user's ability to bring substantially maximum force on the materials handling device, a snow-removal plow. The bends in the Odorisio handle are designed to facilitate the user's ability to push the material handling device in a forward direction, rather than facilitating the user's ability to lift materials vertically, as with a spade. Moreover, the Odorisio handle bends cannot be adjusted, nor can the handle be lengthened or shortened.

Various other types of tool handles have been disclosed in the art, such as in U.S. Pat. No. 1,427,865, Szabo; U.S. Pat. No. 2,221,219, Nelson; U.S. Pat. No. 2,908,929, Cotman; U.S. Pat. No. 4,566,398, Poulin; and U.S. Pat. No. 4,848,818, Smith; and French Patent No. 57597, Gaouyer. None of the described tool handles solve the above-described needs and problems in the art.

A primary objective of the present invention is to provide an improved ergonomically efficient tool having a combination of features allowing the tool to be used in a more ergonomically efficient manner. Another objective of the invention is to provide an improved ergonomically efficient tool having a handle with two adjustable bends, allowing the handle to be bent to enable the user to employ the tool in a more ergonomically efficient manner. A further objective of the invention is to provide a tool having a handle that may be telescoped to allow the handle to be lengthened or shortened to accommodate the height of a user for a more ergonomically efficient use of the tool. A still further objective of the invention is to provide an ergonomically efficient tool with a coupling feature allowing easy attachment of various kinds of tool heads to the tool.

BRIEF DESCRIPTION OF THE INVENTION

An ergonomically efficient tool according to the invention includes an elongated handle having a first adjustable bend and a second adjustable bend and a plurality of attachable tool heads. The bends each typically comprise two members. Each member is attached to the handle, and a proximal end of each member has a plurality of ridges radiating out from a center bore. A joining means, such as a typical nut and bolt, passes through the center bore of each member and, when tightened, brings the ridges together so that they mesh and releasably lock in position. The members can consist of any mechanism which allows adjustment of the bend to a selected angle and releasable locking of the bend at that angle. The tool handle also has a telescoping feature located between the first and second bends which allows the handle to be lengthened or shortened to accommodate the height of a user. Different blades, spades, or other tool heads such as a hoe or rake, can be attached to the tool handle using any known coupling means. The unique combination of the two bends, together with the telescoping feature, allows a user to adjust the shape of the handle to the user's height and permits the tool head to be used to work the ground with a reduced need to stoop over.

BRIEF DESCRIPTION OF THE DRAWINGS

FIG. 1 is a perspective view of an ergonomically efficient tool in accordance with the invention including a shovel blade and other tool heads which can be coupled to the handle of the tool.

FIG. 2 is a side view of an ergonomically efficient tool in accordance with the invention, showing angular movement at the first and second bends.

FIG. 3 is a side view of an ergonomically efficient tool in accordance with the invention showing the telescoping ability of the tool handle.

FIG. 4 is a side view of the adjustment mechanism of one of the handle bends in accordance with the invention.

FIG. 5 is a top-plan view of the adjustment mechanism of one of the handle bends in accordance with the invention.

FIG. 6 is a section view of the telescoping mechanism of the invention taken along line 6—6 of FIG. 3.

FIG. 7 is a perspective view of an ergonomically efficient tool in accordance with the invention showing the handle bends at fixed angles.

DESCRIPTION OF THE ILLUSTRATED EMBODIMENT

An ergonomically efficient tool is illustrated and described.

As shown in FIG. 1, the ergonomically efficient tool generally indicated at 10 comprises an elongated handle 11 having a first bend 12, a second bend 14, and a telescoping mechanism 16 located between the first bend 12 and the second bend 14. In the preferred embodiment, the bends are movable to a multitude of selected angles. In another preferred embodiment, the bends are movable to either a straight or a single angled position. In a further preferred embodiment as seen in FIG. 7, the bends are fixed at an angle, e.g., 45 degrees. In the preferred embodiment illustrated in FIGS. 4 and 5, the bends are shown to have two members 17 each having a tubular portion 18, a proximal end 20 having a center bore 22 and a plurality of ridges 24 radiating out and at approximately right angles from the axis 26 of the center bore 22, and a joining mechanism 28 such as a standard nut and bolt combination. The joining mechanism 28 presses together the opposing ridges 24 to releasably lock together the members 17 at a selected angle. The handle 11 can be bent to any shape selected by the user allowed by the configuration of the ridges 24 of the bends 12 or 14. The joint members 17 are secured to the handle 11 by insertion of the handle into the tubular portion 18.

In the preferred embodiment any one of a plurality of tool heads, such as a shovel blade 30, fork 31, rake 32 or hoe 33, as seen in FIG. 1, may be attached to the handle 11 at the second bend 14. In another preferred embodiment shown in FIG. 7, a coupling mechanism separate from the second bend 14 is provided at the distal end 34 of the handle 11 allowing a choice of tool heads to be attached to the handle 11. In either embodiment the tool head attached is held at a right angle to the plane of the bends of the handle.

In the preferred embodiment the materials used for the handle 10, including the bends 12 and 14, are sufficiently sturdy to allow attachment of ground-working tool heads such as a shovel blade 30. Lighter materials could be used depending on the demands to be placed on the handle 10.

As shown in FIG. 6, a telescoping mechanism 16 comprises a first tubular member 36 having a hole 38 and an outwardly biased retractable finger 40 projecting through and extending outward from the hole 38, and a second tubular member 42 having an inner diameter sized to receive the first tubular member 36. The second tubular member 42 has a plurality of holes 44 arranged along the longitudinal axis 46 of the second tubular portion 42 so that the handle 11 can be lengthened or shortened to a plurality of securely fixed positions defined by the projection of the retractable finger 40 through one or another of the holes 44 in the second tubular portion 42. The telescoping mechanism 16 as illustrated fixes the handle at a selected length and prevents the portions of the handle 11 above and below it from rotating relative to each other, thus maintaining the attached tool head in a plane at a right angle to the plane of the handle. Telescoping mechanisms are well known in the art and it can readily be seen that in other embodiments the telescoping of the handle 11 could be accomplished by means other than the telescoping mechanism 16 illustrated.

There have thus been described certain preferred embodiments of an ergonomically efficient tool. While preferred embodiments have been described and disclosed, it will be recognized by those with skill in the art that modifications are within the true spirit and scope of the invention. The appended claims are intended to cover all such modifications.

I claim:

1. An ergonomically efficient tool comprising
    a tool head for working the ground, said tool head disposed generally in a first plane, and
    an elongated handle attached to said tool head, said handle having
        a first bend having a first angle, and
        a second bend having a second angle,
        said bends disposed generally in a second plane perpendicular to said first plane of said tool head,
    said handle further including telescoping means between said first bend and said second bend for adjusting the length of said handle,
    said first bend, said second bend and said telescoping means cooperating to bend said handle and so that said handle may be adjusted according to the height of a user to minimize the user's need to stoop over to use the tool to work the ground and make it easier and more ergonomically efficient to work with the tool.

2. An ergonomically efficient tool comprising
    an elongated handle, said handle having
        a first bend having a first angle, and
        a second bend having a second angle,
        said bends disposed generally in a first plane,
    a plurality of tool heads, each said tool head for working the ground,
    coupling means for removably attaching any selected one of said plurality of tool heads to said handle,
    any one of said plurality of tool heads when attached to said handle disposed generally in a second plane perpendicular to said first plane of said bends of said handle, and
    said handle further including telescoping means between said first bend and said second bend for adjusting the length of said handle,
    said first bend, said second bend and said telescoping means cooperating to bend said handle and so that said handle may be adjusted according to the height of a user to minimize the user's need to stoop over to use the tool to work the ground and make it easier and more ergonomically efficient to work with the tool.

3. An ergonomically efficient tool comprising
    a tool head for working the ground, said tool head disposed generally in a first plane, and
    an elongated handle attached to said tool head, said handle having
        a first bend fixed at a first angle, and
        a second bend fixed at a second angle,
        said bends disposed generally in a second plane perpendicular to said first plane of said tool head, and
    said handle further including telescoping means between said first bend and said second bend for adjusting the length of said handle,
    said telescoping means cooperating with said first bend and said second bend to bend said handle and so that said handle may be adjusted according to the height of a user to minimize the user's need to stoop over to use the tool to work the ground and make it easier and more ergonomically efficient to work with the tool.

4. An ergonomically efficient tool comprising
    an elongated handle, said handle having
        a first bend fixed at a first angle, and
        a second bend fixed at a second angle,
        said bends disposed generally in a first plane,
    a plurality of tool heads, each said tool head for working the ground,
    coupling means for removably attaching any selected one of said plurality of tool heads to said handle,
    any one of said plurality of tool heads when attached to said handle disposed generally in a second plane perpendicular to said first plane of said bends of said handle, and
    said handle further including telescoping means between said first bend and said second bend for adjusting the length of said handle,
    said first bend, said second bend and said telescoping means cooperating to bend said handle and so that said handle may be adjusted according to the height of a user to minimize the user's need to stoop over to use the tool to work the ground and make it easier and more ergonomically efficient to work with the tool.

5. An ergonomically efficient tool comprising
    a tool head for working the ground, said tool head disposed generally in a first plane, and
    an elongated handle attached to said tool head, said handle having a first bend including means for adjustably fixing said handle in either a straight position or an angled position at said first bend, and a second bend including means for adjustably fixing said handle in either a straight position or an angled position at said second bend, said handle in any angled position disposed generally in a second plane perpendicular to said first plane of said tool head, such that said handle may be adjusted from a straight position to a plurality of angled positions characterized by adjustment of the angularity of said first bend or said second bend, or both, said first bend and said second bend cooperating to bend said handle such that the need for a user to stoop over to use the tool to work the ground is reduced making it easier and more ergonomically efficient to work with the tool.

6. The ergonomically efficient tool of claim 5 wherein said angled position at said first bend and said angled position at said second bend each comprise approximately a forty-five degree angle.

7. The ergonomically efficient tool of claim 5 including a plurality of tool heads, each said tool head for working the ground, and coupling means for removably attaching any selected one of said tool heads to said handle.

8. The ergonomically efficient tool of claim 7 wherein said handle includes telescoping means between said first bend and said second bend for adjusting said length of said handle, said first bend, said second bend, and said telescoping means cooperating so that angularity of said first bend or said second bend, or both, may be adjusted, and so that the handle may be lengthened or shortened by operation of said telescoping means according to the height of a user, to minimize the user's need to stoop over to use the tool to work the ground and make it easier and more ergonomically efficient to work with the tool.

9. The ergonomically efficient tool of claim 5 wherein said handle includes telescoping means between said first bend and said second bend for adjusting said length of said handle, said first bend, said second bend, and said telescoping means cooperating so that the angularity of said first bend or said second bend, or both, may be adjusted, and so that the handle may be lengthened or shortened by operation of said telescoping means according to the height of a user, to minimize the user's need to stoop over to use the tool to work the ground and make it easier and more ergonomically efficient to work with the tool.

10. An ergonomically efficient tool comprising a tool head for working the ground, said tool head disposed generally in a first plane, and an elongated handle attached to said tool head, said handle having a first bend having means for adjustably fixing said first bend in either a straight position or a plurality of angled positions, a second bend having means for adjustably fixing said second bend in either a straight position or a plurality of angled positions, said first bend in any angled position and said second bend in any angled position disposed generally in a second plane perpendicular to said first plane of said tool head, said first bend and said second bend cooperating so that said handle may be adjusted to minimize a user's need to stoop over to use the tool to work the ground making it easier and more ergonomically efficient to work with the tool.

11. The ergonomically efficient tool of claim 10 wherein said means for adjustably fixing said first bend in a straight or in angled positions includes means for releasably locking said bend in any selected position with sufficient holding force to retain said bend in the selected position while using the tool for working the ground, and said means for adjustably fixing said second bend in a straight or in angled positions includes means for releasably locking said bend in any selected position with sufficient holding force to retain said bend in the selected position while using the tool for working the ground.

12. The ergonomically efficient tool of claim 10 wherein each of said means for adjustably fixing said bends comprises a first member having a first tubular means for securing said first member to said handle, said first member further having a proximal end having a center bore, said center bore having an axis, said proximal end further having a plurality of ridges radiating out from and at approximately right angles to said axis of said center bore, a second member having a second tubular means for securing said second member to said handle, said second member further having a proximal end having a center bore, said center bore having an axis, said proximal end further having a plurality of ridges radiating out from and at approximately right angles to said axis of said center bore, and a joining means passing through said center bores of said first member and said second member for firmly engaging said raised ridges of said first member with said raised ridges of said second member, such that said raised ridges of said first member mesh with said raised ridges of said second member to disengageably lock said first and second members together at a selected angle.

13. The ergonomically efficient tool of claim 12 including a plurality of tool heads, each said tool head for working the ground, and coupling means for removably attaching any selected one of said tool heads to said handle.

14. The ergonomically efficient tool of claim 10 including a plurality of tool heads, each said tool head for working the ground, and coupling means for removably attaching any selected one of said tool heads to said handle.

15. The ergonomically efficient tool of claim 14 wherein said handle includes telescoping means between said first bend and said second bend for adjusting the length of said handle, said first bend, said second bend, and said telescoping means cooperating so that the angularity of either said first bend, or said second bend, or both, may be adjusted, and so that the handle may be lengthened or shortened by operation of said telescoping means according to the height of a user, to minimize the user's need to stoop over to use the tool to work the ground and make it easier and more ergonomically efficient to work with the tool.

16. The ergonomically efficient tool of claim 14 wherein said means for adjustably fixing said second bend in either a straight position or a plurality of fixed positions includes said coupling means for removably attaching any selected one of said tool heads to said handle.

17. The ergonomically efficient tool of claim 16 wherein said handle includes telescoping means between said first bend and said second bend for adjusting the length of said handle, said first bend, said second bend, and said telescoping means cooperating so that the angularity of either said first bend or said second bend, or both, may be adjusted, and so that the handle may be lengthened or shortened by operation of said telescoping means according to the height of a user, to minimize the user's need to stoop over to use the tool to work the ground and make it easier and more ergonomically efficient to work with the tool.

18. The ergonomically efficient tool of claim 10 wherein said handle includes telescoping means between said first bend and said second bend for adjusting said length of said handle, said first bend, said second bend, and said telescoping means cooperating so that the angularity of either said first bend or said second bend, or both, may be adjusted, and so that the handle may be lengthened or shortened by operation of said telescoping means according to the height of a user, to minimize the user's need to stoop over to use the tool to work the ground and make it easier and more ergonomically efficient to work with the tool.

19. The ergonomically efficient tool of claim 18 wherein said telescoping means includes locking means for securing said handle at a selected length.

20. The ergonomically efficient tool of claim 18 wherein said telescoping means comprises
 a first tubular member,
 a second tubular member having a longitudinal axis and a hollow interior, said hollow interior having a diameter sized to receive said first tubular member, said first tubular member slidingly received in said hollow interior of said second tubular member,
 said first tubular member having a hole and an outward-biased, retractable finger projecting outward through said hole,
 said second tubular member having a plurality of holes sized to receive freely said finger located at spaced points along said longitudinal axis, such that said second tubular member may be slid over said first tubular member and said handle can be securely fixed in a plurality of positions characterized by said finger protecting through one of said plurality of holes in said second tubular member.

21. An ergonomically efficient tool comprising
 a tool head for working the ground, said tool head disposed generally in a first plane, and
 an elongated handle attached to said tool head said handle having
  a first bend having means for adjustably fixing said first bend in either a straight position or a plurality of angled positions,
  a second bend having means for adjustably fixing said second bend in either a straight position or a plurality of angled positions,
  said first bend in any angled position and said second bend in any angled position disposed generally in a second plane perpendicular to said first plane of said tool head, and
  said handle further having telescoping means between said first bend and said second bend for adjusting the length of said handle, said telescoping means including locking means for releasably locking said handle at a selected length, said first bend, said second bend, and said telescoping means cooperating so that the angularity of said first bend, or said second bend, or both, may be adjusted, and so that the handle may be lengthened or shortened by operation of said telescoping means according to the height of a user, to minimize the user's need to stoop over to use the tool to work the ground and make it easier and more ergonomically efficient to work with the tool.

22. The ergonomically efficient tool of claim 21 including
 a plurality of tool heads, each said tool head for working the ground, and
 coupling means for removably attaching any selected one of said tool heads to said handle.

23. The ergonomically efficient tool of claim 21 including
 a plurality of tool heads, each said tool head for working the ground, and
 said second bend having coupling means for removably attaching any selected one of said tool heads to said handle.

24. The ergonomically efficient tool of claim 23 wherein said first and second bends each comprise
 a first member having a first tubular means for securing said first member to said handle, said first member further having a proximal end having a center bore, said center bore having an axis, said proximal end further having a plurality of ridges radiating out from and at approximately right angles to said axis of said center bore,
 a second member having a second tubular means for securing said second member to said handle, said second member further having a proximal end having a center bore, said center bore having an axis, said proximal end further having a plurality of ridges radiating out from and at approximately right angles to said axis of said center bore, and
 a joining means passing through said center bores of said first member and said second member for firmly engaging said raised ridges of said first member with said raised ridges of said second member,
 such that said raised ridges of said first member mesh with said raised ridges of said second member to disengageably lock said first and second members together at a selected angle.

25. An ergonomically efficient tool comprising
 a tool head for working the ground, said tool head disposed generally in a first plane, and
 an elongated handle attached to said tool head, said handle having
  a first bend having a first fixed angle, and
  a second bend having a second fixed angle,
  said bends disposed generally in a second plane perpendicular to said first plane of said tool handle,
 said handle including telescoping means between said first bend and said second bend for adjusting the length of said handle,
 said telescoping means cooperating with said first bend and said second bend so that said handle may be adjusted according to the height of a user, to minimize the user's need to stoop over to use the tool to work the ground and make it easier and more ergonomically efficient to work with the tool.

26. An ergonomically efficient tool comprising an elongated handle, a plurality of tool heads, each said tool head for working the ground, and coupling means for removably attaching any selected one of said tool heads to said handle, any said tool head attached to said handle disposed generally in a first plane,
   said handle having
      a first bend having a first fixed angle, and
      a second bend having a second fixed angle,
      said bends disposed generally in a second plane perpendicular to said first plane of said handle,
   said handle further including telescoping means between said first bend and said second bend for adjusting the length of said handle, said telescoping means cooperating with said first bend and said second bend so that said handle may be adjusted according to the height of a user to minimize the user's need to stoop over to use the tool to work the ground and make it easier and more ergonomically efficient to work with the tool.

\* \* \* \* \*